(12) United States Patent
Poulsen et al.

(10) Patent No.: US 11,885,574 B2
(45) Date of Patent: Jan. 30, 2024

(54) HYGIENIC HEAT EXCHANGER

(71) Applicant: SPX Flow Technology Danmark A/S, Silkeborg (DK)

(72) Inventors: Ole Poulsen, Engesvang (DK); Knud Thorsen, Gjern (DK)

(73) Assignee: SPX Flow Technology Danmark A/S, Silkeborg (DK)

( * ) Notice: Subject to any disclaimer, the term of this patent is extended or adjusted under 35 U.S.C. 154(b) by 703 days.

(21) Appl. No.: 16/853,175

(22) Filed: Apr. 20, 2020

(65) Prior Publication Data
US 2020/0248972 A1 Aug. 6, 2020

Related U.S. Application Data

(63) Continuation of application No. 14/783,166, filed as application No. PCT/EP2014/057237 on Apr. 10, 2014, now Pat. No. 10,627,169.

(30) Foreign Application Priority Data

Apr. 11, 2013 (DK) .......................... PA 2013 00215

(51) Int. Cl.
*F28F 1/36* (2006.01)
*F28D 7/16* (2006.01)
(Continued)

(52) U.S. Cl.
CPC ............. *F28F 1/36* (2013.01); *B23K 9/0288* (2013.01); *F28D 7/1607* (2013.01); *F28F 9/08* (2013.01);
(Continued)

(58) Field of Classification Search
CPC ............... B23P 15/26; Y10T 29/49364; Y10T 29/49393; B23K 9/0288; B23K 2101/14;
(Continued)

(56) References Cited

U.S. PATENT DOCUMENTS 2,363,526 A 11/1944 Hobbs
2,389,175 A 11/1945 Woods
(Continued)

FOREIGN PATENT DOCUMENTS

CN 202267401 U 6/2012
CN 102538562 A 7/2012
(Continued)

OTHER PUBLICATIONS

"Tubular Heat Exchangers" Tetra Spiraflo C, Jun. 2006, 4 Pages.
(Continued)

*Primary Examiner* — Jason L Vaughan
(74) *Attorney, Agent, or Firm* — IceMiller LLP

(57) ABSTRACT

A hygienic food product to food product heat exchanger (1). The heat exchanger (1) has an elongated and hollow housing (4), a metal tube plate (6) arranged at each of the opposite ends of the elongated housing (4) for defining a closed interior space (10) inside the elongated and hollow housing (4), a plurality of tightly spaced metal tubes (2) axially extending between the tube plates (2) with the ends of the tubes being received in correspondingly tightly spaced holes the tube plates (6) or with the lumen of the tubes being aligned with said correspondingly tightly spaced holes in the tube plates. The metal tubes (2) are sealingly secured to the metal tube plates (6) by a welding joint (20) on the inwardly facing side of the tube plates (6).

20 Claims, 4 Drawing Sheets

(51) Int. Cl.
  *F28F 9/18* (2006.01)
  *F28F 13/06* (2006.01)
  *F28F 13/12* (2006.01)
  *B23K 9/028* (2006.01)
  *F28D 21/00* (2006.01)
  *B23K 101/14* (2006.01)
  *F28F 9/08* (2006.01)

(52) U.S. Cl.
  CPC .............. *F28F 13/06* (2013.01); *F28F 13/12* (2013.01); *B23K 2101/14* (2018.08); *F28D 2021/0042* (2013.01); *F28F 2275/06* (2013.01)

(58) Field of Classification Search
  CPC .. F28D 7/16; F28D 7/1607; F28D 2021/0042; F28F 9/18; F28F 9/22; F28F 9/182; F28F 9/0229
  See application file for complete search history.

(56) References Cited

U.S. PATENT DOCUMENTS

| | | | |
|---|---|---|---|
| 2,440,803 A | 5/1948 | Lea | |
| 2,730,337 A | 1/1956 | Roswell | |
| 2,914,346 A | 11/1959 | Ryder | |
| 2,962,805 A | 12/1960 | Heimberger et al. | |
| 2,996,600 A | 8/1961 | Gardner et al. | |
| 3,078,551 A | 2/1963 | Peter et al. | |
| 3,185,210 A | 5/1965 | Kuhne et al. | |
| 3,265,128 A | 8/1966 | Pierre | |
| 3,426,841 A | 2/1969 | Johnson | |
| 3,716,099 A | 2/1973 | Deschamps et al. | |
| 3,769,489 A * | 10/1973 | Charlesworth | B23K 9/0288 165/173 |
| 3,771,596 A | 11/1973 | Schlichting | |
| 4,066,861 A * | 1/1978 | Broodman | F28F 9/18 165/173 |
| 4,071,083 A | 1/1978 | Droin | |
| 4,221,263 A * | 9/1980 | Meyer | B23K 9/0288 228/183 |
| 4,332,294 A | 6/1982 | Drefahl et al. | |
| 4,474,644 A | 10/1984 | Poulsen | |
| 4,535,214 A * | 8/1985 | Meyer | B23K 9/035 228/183 |
| 4,579,171 A | 4/1986 | Stafford et al. | |
| 4,697,637 A | 10/1987 | Young | |
| 4,943,001 A * | 7/1990 | Meyer | F28F 9/182 228/183 |
| 4,965,431 A | 10/1990 | Monteleone | |
| 5,036,913 A | 8/1991 | Murphy et al. | |
| 5,101,892 A * | 4/1992 | Takeuchi | F28F 9/182 165/173 |
| 5,150,520 A | 9/1992 | Derisi | |
| 5,344,717 A | 9/1994 | Dutton et al. | |
| 5,464,057 A | 11/1995 | Albano et al. | |
| 5,494,100 A | 2/1996 | Peze | |
| 5,749,414 A * | 5/1998 | Damsohn | F28F 9/18 228/183 |
| 6,626,235 B1 | 9/2003 | Christie | |
| 6,675,882 B1 | 1/2004 | Luberda | |
| 6,899,169 B1 | 5/2005 | Cox | |
| 7,377,307 B1 | 5/2008 | Ijiri et al. | |
| 7,462,262 B2 | 12/2008 | Hino et al. | |
| 7,954,691 B2 | 6/2011 | Roos et al. | |
| 8,177,932 B2 | 5/2012 | Becnel et al. | |
| 8,196,644 B1 | 6/2012 | Niske | |
| 8,439,250 B2 * | 5/2013 | Takeshita | B23K 20/1265 228/2.1 |
| 9,101,997 B2 | 8/2015 | Bruck et al. | |
| 9,302,205 B1 | 4/2016 | Nehlen, III | |
| 9,541,332 B2 | 1/2017 | Zoch et al. | |
| 9,581,395 B2 | 2/2017 | Nehlen, III | |
| 2001/0006102 A1 | 7/2001 | Nishimura et al. | |
| 2003/0010479 A1 | 1/2003 | Hayashi et al. | |
| 2003/0089491 A1 | 5/2003 | Mitsumoto et al. | |
| 2004/0049915 A1 | 3/2004 | Dunand-Roux et al. | |
| 2004/0089440 A1 | 5/2004 | Sanders | |
| 2004/0238161 A1 | 12/2004 | Al-Anizi et al. | |
| 2005/0061025 A1 | 3/2005 | Ayub | |
| 2005/0167091 A1 | 8/2005 | Juschka | |
| 2006/0073086 A1 | 4/2006 | Sakai et al. | |
| 2007/0131401 A1 * | 6/2007 | Daly | B29C 66/81422 165/157 |
| 2008/0190593 A1 | 8/2008 | Wang et al. | |
| 2009/0065185 A1 | 3/2009 | Jekerle | |
| 2010/0132927 A1 | 6/2010 | Benetton et al. | |
| 2010/0243208 A1 | 9/2010 | Kar et al. | |
| 2012/0199324 A1 | 8/2012 | Pazzaglia et al. | |
| 2012/0267070 A1 | 10/2012 | Mack | |
| 2012/0312514 A1 | 12/2012 | Erickson | |
| 2013/0105127 A1 | 5/2013 | Postma et al. | |
| 2013/0175014 A1 * | 7/2013 | Hong | F28F 9/18 165/157 |
| 2013/0199462 A1 | 8/2013 | Bienentreu et al. | |
| 2013/0228318 A1 | 9/2013 | Williams et al. | |
| 2014/0000845 A1 | 1/2014 | Vanderwees et al. | |
| 2014/0174424 A1 | 6/2014 | Chen et al. | |
| 2014/0262162 A1 | 9/2014 | Zimmer et al. | |
| 2014/0262173 A1 | 9/2014 | Nagurny et al. | |
| 2014/0345828 A1 | 11/2014 | Ehmann et al. | |
| 2015/0000881 A1 | 1/2015 | Tamura et al. | |
| 2015/0034056 A1 | 2/2015 | Cuesta et al. | |
| 2015/0034284 A1 | 2/2015 | Sullivan | |
| 2015/0083382 A1 | 3/2015 | Feinstein | |
| 2015/0292824 A1 | 10/2015 | Andersen et al. | |
| 2016/0003552 A1 | 1/2016 | Chordia et al. | |
| 2016/0025416 A1 | 1/2016 | Pitts et al. | |
| 2016/0202001 A1 | 7/2016 | Eller et al. | |
| 2016/0288232 A1 * | 10/2016 | Yoo | B23K 3/021 |
| 2016/0288240 A1 * | 10/2016 | Yoo | B23K 9/0288 |
| 2017/0176109 A1 | 6/2017 | Hideyuki | |
| 2017/0211895 A1 | 7/2017 | Frechette et al. | |
| 2017/0350662 A1 | 12/2017 | Fioriti et al. | |
| 2018/0023423 A1 | 1/2018 | Singh et al. | |

FOREIGN PATENT DOCUMENTS

| | | |
|---|---|---|
| CN | 102667390 A | 9/2012 |
| DE | 9321031 U1 | 11/1995 |
| DE | 60019635 T2 | 3/2006 |
| EP | 1154143 A1 | 11/2001 |
| EP | 1731849 A1 | 12/2006 |
| EP | 2149770 B1 | 2/2013 |
| EP | 2984438 B1 | 12/2018 |
| GB | 0848106 A | 9/1960 |
| JP | 07-324887 A | 12/1995 |
| JP | 2002-156196 A | 5/2002 |
| JP | 2003-083174 A | 3/2003 |
| JP | 2006-038337 A | 2/2006 |
| JP | 2006-234232 A | 9/2006 |
| JP | 2010-117121 A | 5/2010 |
| KR | 10-1359778 B1 | 2/2014 |
| WO | 2006/090626 A1 | 8/2006 |
| WO | 2009/148822 A2 | 12/2009 |
| WO | 2010/068157 A1 | 6/2010 |
| WO | 2011/047475 A1 | 4/2011 |

OTHER PUBLICATIONS

Australian Patent Examination Report dated Oct. 22, 2015.
Australian Patent Examination Report No. 2 issued in Australian Patent Application No. 2014253133 dated Aug. 18, 2016.
Chinese Office Action dated Jun. 30, 2016, with English translation.
International Search Report (ISR) (PCT Form PCT/ISA/210) dated Aug. 14, 2014, in PCT/EP2014/057237.
Kirchner, Construction of Heat Exchangers Springer-Verlag Berlin Heidelberg, 2010, pp. 1525-1551.
Kuppan "Heat Exchanger Design Handbook", Marcel Dekker AG, 2000, p. 975-986.
Notice of Acceptance issued in Australian Patent Application No. 2014253133 accepted Aug. 29, 2016.

(56) References Cited

OTHER PUBLICATIONS

Notice of Opposition issued against European Patent No. EP 2984438 B1, dated Sep. 20, 2019.
Schmidt et al., "Sanitary Design and Construction of Food Equipment", IFAS Extension, University of Florida, pp. 1-7.
Singh et al., "Mechanical Design of Heat Exchangers," Springer-Verlag Berlin,1984, 156 Pages.
Decision for European Patent Office revoking EP2984438 B1 dated Nov. 24, 2021.
Wikipedia printout from the Internet with the title "Symbols and conventions used in welding documentation", lastly edited in Apr. 2013.
Schmidt et al., "Sanitary Design and Construction of Food Equipment" University of Florida, IFAS Extension, FSHN0409, Original publication date May 2005; Reviewed; May 2008, 8 Pages.
The Effect of Fouling, 30 pages.

* cited by examiner

HYGIENIC HEAT EXCHANGER

CROSS-REFERENCE TO RELATED APPLICATIONS

This application claims benefit to and is a continuation of U.S. Patent Application No. 14/783,166, filed Oct. 8, 2015, now U.S. Pat. No. 10,327,169, which is a National Stage of International Application No. PCT/EP2014/057237, filed Apr. 10, 2014, which claims priority to Danish Application No. PA 2013 00215, filed Apr. 11, 2014, which are hereby incorporated by reference in their entirety.

The present disclosure relates to a hygienic food product to food product tubular type heat exchanger that is suitable for us in food processing applications, i.e. a heat exchanger that can be easily and regularly cleaned inside and outside by ordinary cleaning in place by e.g. rinsing with an acidic fluid.

BACKGROUND ART

Known food product tubular heat exchangers have a tube plate at each end of an elongated and typically cylindrical housing (shell) with a plurality of densely packed axial tubes extending between the two tube plates as a tube bundle. The ends of the tubes are received in corresponding through going holes in respective tube plates. During manufacturing of the heat exchanger the ends of the tubes are inserted into the holes and with a relatively tight fit and this relatively tight fit can be increased by rolling the inner side of the tubes so that the tube wall becomes thinner in the rolled area thereby tries to increase its diameter which causes the outer surface of the rolled tube area to be pressed against wall of the hole in the tube plate. Rolling is only applied in the end portion of the tube that is received inside a hole in the tube plate. Thereafter, the end of the tube is welded to the tube plate at the outer side of the tube. This procedure gives a strong connection that is satisfactory in various aspects such as production costs, reliability and preventing leakage of liquid from the interior of the cylindrical housing.

However, in the field of hygienic heat exchangers, i.e. heat exchangers that are suitable for use with liquid food products and that come in direct contact with liquid food products it is of utmost importance to avoid sharp corners, crevices, fissures, pockets or other forms of recesses are difficult to rinse and sterilize and where food rests can remain thus risking that microorganisms start to flourish.

The rolled joint with the weld at the outer side of the tube plates in the known heat exchangers (as shown in FIG. 6) does not live up to the hygienic requirements because it leaves crevices between the outer surface of the tube and the inner surface of the holes of the tube plate and it leaves a sharp corner 26 at the transition between the inner side of the tube plate and the outer surface of the tubes. Therefore, in these type of heat exchangers food products can only be used in the lumen of the tubes and not in the interior of the elongated housing.

DISCLOSURE

On this background, it is an object of this disclosure to provide a hygienic axial tube heat exchanger that can operate with liquid food products in the lumen of the tubes and also in the interior of heat exchanger that surrounds the tubes in order to provide a food product to food product heat exchanger, i.e. a heat exchanger that overcomes or at least reduces the drawbacks mentioned above.

This object is achieved by providing a hygienic food product to food product heat exchanger, the heat exchanger comprising: an elongated and hollow housing; a metal tube plate arranged at each of the opposite ends of the elongated housing for defining a closed interior space in the elongated and hollow housing; a plurality of tightly spaced metal tubes axially extending between the tube plates with the ends of the tubes being received in correspondingly tightly spaced holes in the tube plates or the lumen of the tubes being aligned with said correspondingly tightly spaced holes in the tube plates; wherein the metal tubes are sealingly secured to the metal tube plates by a welding joint on the inwardly facing side of the tube plates, whereby the welding joint extends along the complete circumference of a tube and provides for a smooth transition between the outer surface of a tube and the inwardly facing side of the tube plate.

By securing the tubes with a welding joint on the inner side of the tube plates a smooth, crevices and fissure free connection is created between the tubes and the tube plate that is hygienic and therefore allows liquid food products to be used in the interior space surrounding the tubes. This hygienic design will even allow for processing sterile and aseptic food products.

In another embodiment the welding joint is located at the transition between the outer surface of the tubes and the inwardly facing surface of the tube plates.

In another embodiment the each of the tubes extends along a straight line between the tube plates.

In another embodiment the distance between the center lines of the tubes is less than twice the outer diameter of the tubes.

In another embodiment the tubes have an outer diameter between 10 mm and 50 mm, and preferably all of the tubes have the same diameter.

In another embodiment the tube plates have a substantial thickness and the holes are through going holes and the tubes are inserted in full length of the holes.

In another embodiment the tube plate has a thickness that is larger than the outer diameter of the tubes.

The object above is also achieved by providing a method of manufacturing an axial tubular heat exchanger that comprises metal tube plates at each opposite end of an elongated heat exchanger housing and tightly spaced axial metal tubes extending between the tube plates, the method comprising inserting the ends of the tubes in corresponding holes in the tube plates or aligning the lumen of the tubes being with said correspondingly tightly spaced holes in the tube plates and creating a joint by welding between the tubes and the tube plates on the side of the tube plates that faces the interior of the elongated cylindrical housing for providing a smooth rounded transition between the outer surface of a tube and the inwardly facing side of said tube plate.

In another embodiment of the method the joint is welded from the lumen of the tubes.

The object above is also achieved by providing a hygienic food product to food product heat exchanger, the heat exchanger comprising: an elongated and hollow cylindrical housing; a metal tube plate at each of the opposite ends of the elongated housing; a tube bundle with a plurality of tightly spaced metal tubes axially extending between the tube pates with the ends of the tubes being received in correspondingly tightly spaced holes in the respective tube plates or with the lumen of the tubes being aligned with said correspondingly tightly spaced holes in the tube plates; a first inlet connected to the openings at one end of the tubes for allowing a first liquid food product medium to enter the interior of the tubes; a first outlet connected to the openings at the other end of the tubes for allowing the first liquid food product medium to leave the interior of the tubes; a second inlet for allowing a second liquid food product to enter the interior of the elongated cylindrical housing; a second outlet for allowing a second liquid food product to leave the interior of the elongated housing; the second outlet being axially spaced from the second inlet so that the second liquid food product flows over the outer side of the tubes between the second inlet and the second outlet; the second inlet can be tangentially directed and the second outlet can be tangentially directed for causing a helical flow path for the second liquid food medium when it flows from the second inlet to the second outlet.

In an embodiment the second inlet comprises a tangentially directed tubular conduit connected to the elongated and hollow cylindrical housing and wherein the second outlet comprises a tangentially directed tubular conduit connected to the elongated and hollow cylindrical housing.

In another embodiment the tangentially directed tubular conduit of the second inlet has an axis that is offset relative to the axis of the elongated cylindrical housing and the tangentially directed tubular conduit of the second outlet has an axis that is offset relative to the axis of the elongated cylindrical housing.

In another embodiment the heat exchanger further comprises a helical rod wound around and secured to the tube bundle for stimulating the second liquid food product to follow a helical flow path when it flows from the second inlet to the second outlet.

Further objects, features, advantages and properties of the hygienic heat exchanger and method according to the disclosure will become apparent from the detailed description.

BRIEF DESCRIPTION OF THE DRAWINGS

In the following detailed portion of the present description, the disclosure will be explained in more detail with reference to the exemplary embodiments shown in the drawings, in which.

DETAILED DESCRIPTION OF PREFERRED EMBODIMENTS

In the following detailed description of the hygienic heat exchanger will be described by the example embodiments.

Figure 1:
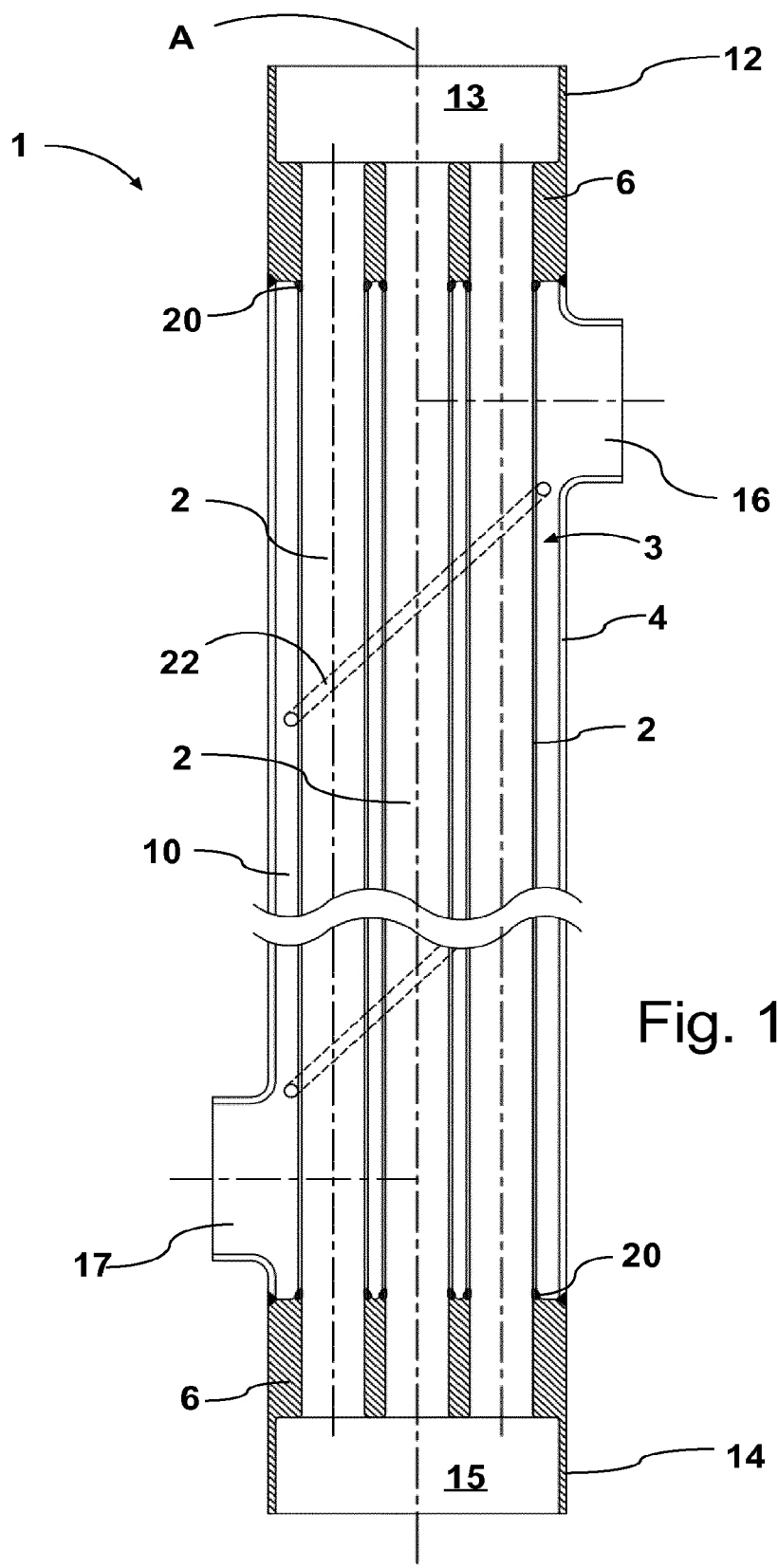
FIG. 1, is a sectional view through a hygienic heat exchanger according to an example embodiment.
Figure 2:
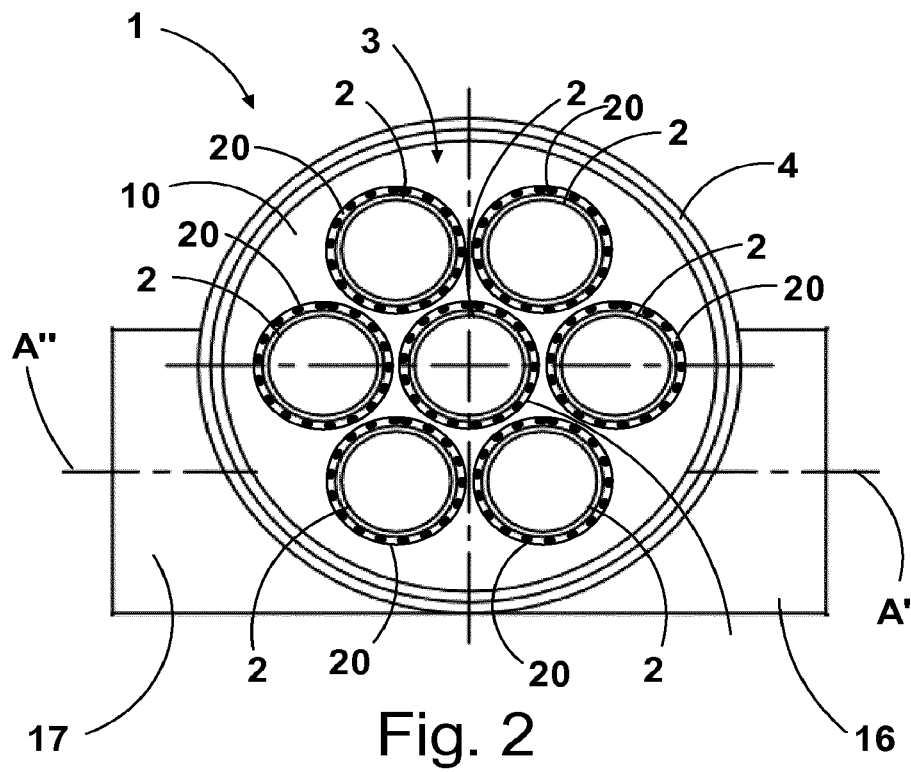
FIG. 2, is a cross-sectional view of the hygienic heat exchanger shown in FIG. 1, FIG. 3, is a sectional view showing details of the end portion of a hygienic heat exchanger shown in FIG. 1, FIG. 4, is a diagrammatic depiction of the flow of a liquid medium around the tubes of the hygienic heat exchanger shown in FIG. 1
Figure 3:
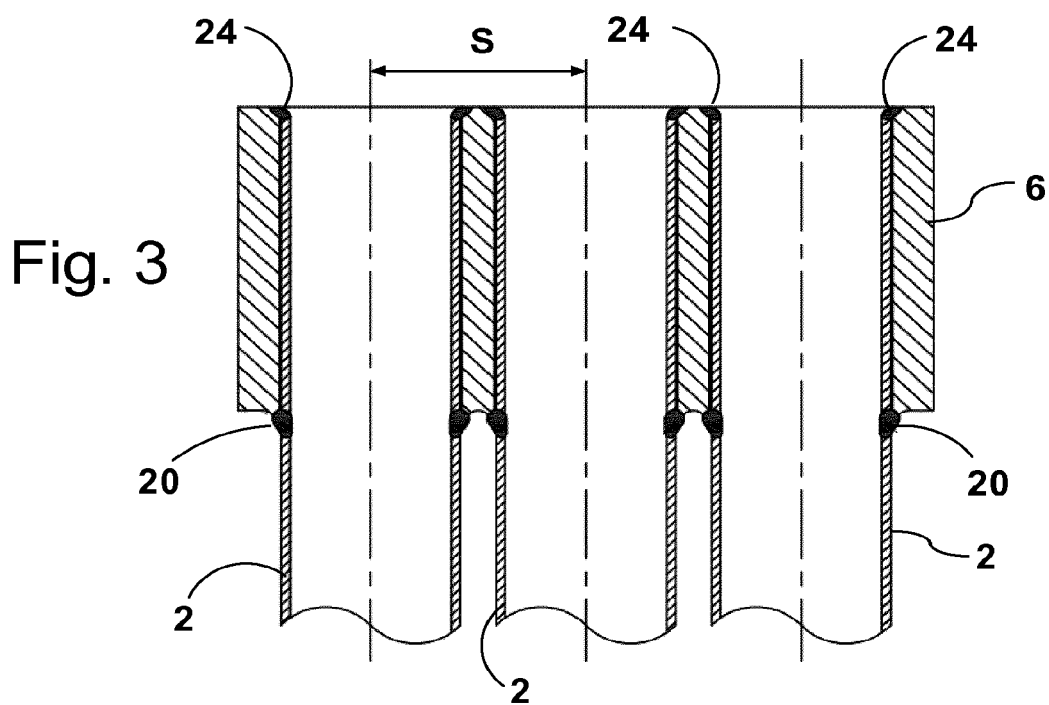

FIGS. 1 to 3 show an example embodiment of a single pass straight-tube heat exchanger 1. The heat exchanger 1 is provided with a plurality of closely spaced inner tubes 2 that together form a tube bundle 3 that is situated in a shell 4. The shell 4 forms an elongated and hollow cylindrical housing 4. The inner tubes 2 can either be plain or corrugated.

The ends of the shell 4 are closed by a tube plate 6 at each end of the shell 4. The tube plates 6 are provided with a plurality of tightly spaced through going holes that are arranged in a suitable pattern.

The disk shaped tube plates 6 have a substantial thickness, typically the thickness of the tube plates 6 is larger than the diameter of the tubes 2. The tube plates 6 sealingly secured to the respective end of the shell 6 and the tube plates are sealingly secured to the tubes 2 so as to create a hermetically sealed interior space 10 inside the shell 4 with one side of a tube plate facing the interior of the heat exchanger 1 and the other side of the tube plates facing an inlet or an outlet plenum.

A first inlet 12 with an inlet plenum 13 is situated at one of the ends of the shell 4. A first outlet 14 with an outlet plenum 15 is situated at the other end of the shell 4. The first inlet 12 allows a medium to enter the heat exchanger 1 and to flow through the lumen in the tubes 2 to the first outlet 14. The first outlet 14 allows the medium to leave the heat exchanger 1. The placement the first inlet 12 and the first outlet 14 can be interchanged so that the medium flows in the opposite direction through the lumen of the tubes 2.

The straight (corrugated or not) tubes 6 extend parallel and closely spaced, typically the center line to center line distance S is less than twice the outer diameter of the tubes 2, as a tube bundle 3 in the interior 10 of the heat exchanger 1.

The tubes 2, the tube plates 6 and the shell 4 are in an embodiment made from a corrosion resistant metal, such as stainless steel, so that the heat exchanger is strong and reliable, has good heat conducting qualities and can be disinfected or sterilized using an aggressive medium, such as a strong acid.

The longitudinal ends of the tubes 2 are received in the corresponding holes in the tube plates 6. In an embodiment the tubes 2 are inserted so deep into the holes that the ends of the tubes 2 are flush with the side of the tube plate 6 that faces the inlet or outlet plenum. The holes in the tube plate 6 have essentially the same diameter as the outer diameter of the tubes 2 so that the tubes 2 fit quite precisely into the holes so that the tubes can be inserted in the holes with applying no more than a moderate force.

The joint between the tube plates 6 that faces the interior space 10 and the outer surface of the tubes 2 is a welded joint that provides a smooth rounded transition between the tubes 2 and the tube plate 6. The tubes 2 are in an embodiment secured to the tube plates 6 by a welded joint 20 that surrounds each of the tubes 2. The welded joint 20 is placed at the transition between a tube 2 and the tube plate 6, i.e. on the inwardly facing side of the tube plates 6. The welded joint 20 provides a smooth transition between the tube 2 and the tube plate 6 that is free of cracks, crevices, fissures and other recesses and therefore provides a hygienic construction that can be allowed to come in contact with food products since it can be effectively rinsed and sterilized. The welded joint 20 is also strong, reliable and provides for a hermetic seal.

The tubes 2 are welded to the tube plate at two positions, i.e. in addition to the connection at the inner side of the tube plate 6, the extremity of the tube 2 is connected to the tube plate 6 at the outer side of the tube plate 6 by a welded joint 24. The additional joint 24 at the outer side of the tube plate 6 reinforces the connection between the tubes 2 and the tube plate 6.

In an embodiment the welded joint 20 is created by welding from the lumen of the tube 2, so that the welded joint 20 is created from the inside of the tube 2. This is particularly advantageous since the space surrounding the tubes 2 is too small for applying a welding torch at the outer circumference of the tubes 2.

Thus, the joint is created by melting metal by welding between the tubes 2 and the tube plates 6 on the side of the tube plates 6 that faces the interior 10 of the elongated cylindrical housing.

By securing the tubes 2 with a welding joint 20 on the inner side of the tube plates 6 a smooth, crevice and fissure free connection is created between the tubes 2 and the tube plate 6 that is hygienic and therefore allows liquid food products to be used in the interior space 10 surrounding the tubes 2.

In an embodiment the distance S between the center lines of the tubes 2 is less than twice the outer diameter of the tubes 2. In an embodiment the tubes have an outer diameter between 10 mm and 50 mm, and preferably all of the tubes have the same diameter The heat exchanger 1 is provided with a second inlet 16 for allowing a second liquid food product or other medium to enter the interior 10 of the shell 4. The heat exchanger 1 is also provided with a second outlet 17 for allowing the second liquid food product to leave the interior 10. The second outlet 17 is axially spaced from the second inlet 16 so that the second liquid food product flows over the outer side of the tubes 2 between the second inlet 16 and the second outlet 17. The second inlet 16 is tangentially directed and the second outlet is tangentially directed for causing a helical flow path for the second liquid food medium when it flows from the second inlet 16 to the second outlet 17, the tangential component of the helical flow path being illustrated in FIG. 4.

In an embodiment the second inlet 16 is formed by a tangentially directed tubular conduit connected to the shell 4 and the second outlet 17 is formed by a tangentially directed tubular conduit connected to the shell 4. The tangentially directed tubular conduit of the second inlet 16 has an axis A' that is offset relative to the axis A of the shell 4 and the tangentially directed tubular conduit of the second outlet 17 has an axis A" that is also offset relative to the axis A of the shell 4.

In an embodiment a helical rod 22 is wound around- and secured to the tube bundle 3 for stimulating the second liquid food product to follow a helical flow path when it flows from the second inlet 16 to the second outlet 17. The helical rod 22 is in an embodiment made of a corrosion resistant metal. In another embodiment the helical rod 22 is made of a plastic material. The helical rod 22 promotes the flow of the second liquid food product to assume a helical path, i.e. to have a tangential component in addition to an axial component. In an embodiment the steepness of the helix of the rod 22 is approximately 45 deg. The helical rod 22 may have a circular, polygonal, oval, square cross-sectional shape or other suitable shape.

In an embodiment the tube assembly including the helical rod can be pulled out of the shell 4 for inspection.

The placing of the second inlet 16 and the second outlet 17 can be interchanged, and the heat exchanger 1 can be arranged for parallel flow or counter flow.

Figure 4:
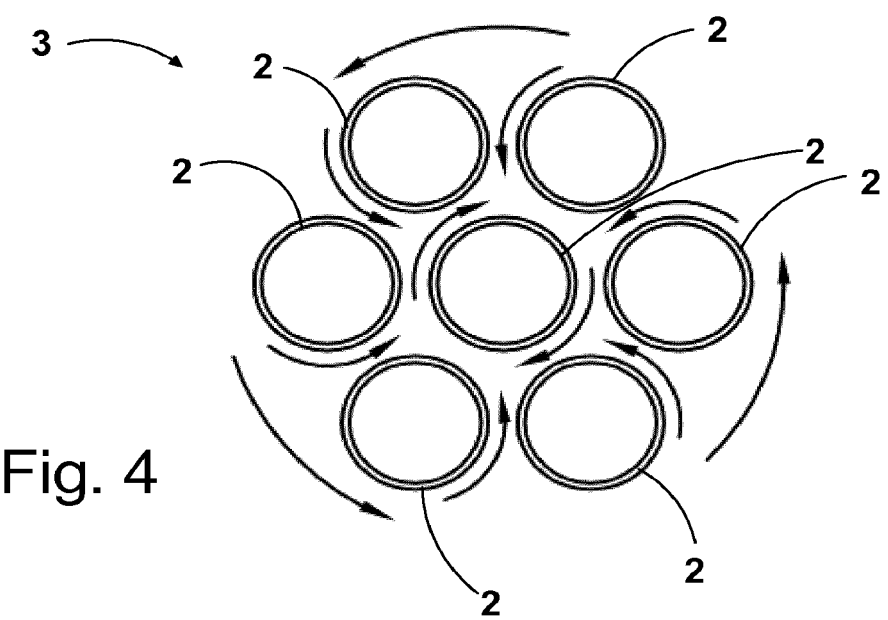

The tangential component of the helical flow of the medium in the interior space 10 is illustrated in FIG. 4 by the curved arrows. The helical flow provides for a faster and more effective heat transfer between the medium and the outer surface of the tubes 2 when compared to a traditional parallel flow (a flow parallel with the tubes 2) and avoids fouling.

Figure 5:
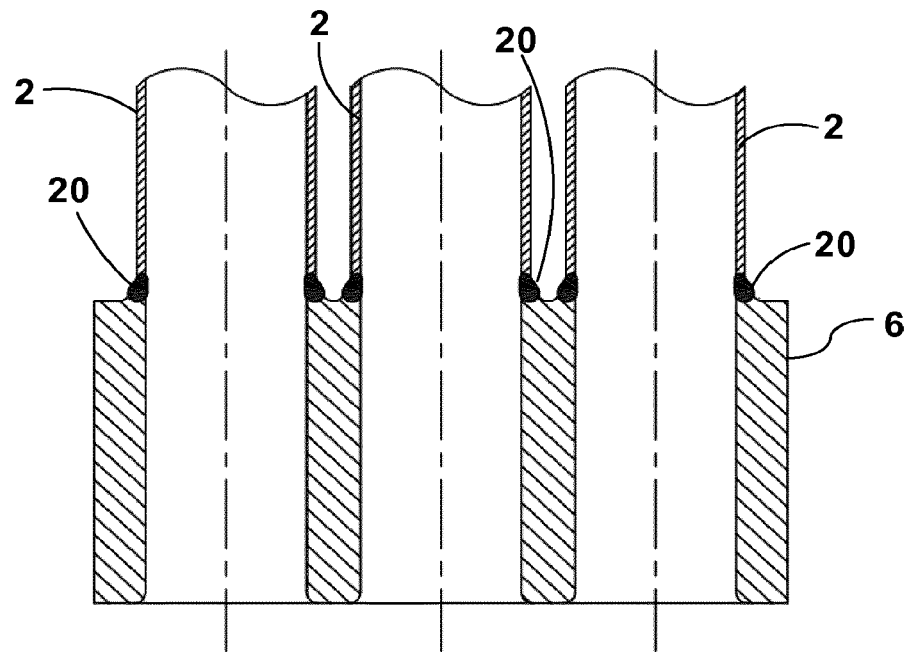
FIG. 5 is a sectional view showing details of another example embodiment of end portion of a hygienic heat exchanger shown in FIG. 1.

FIG. 5 shows yet another embodiment, this embodiment being similar to the embodiments described above, but with the essential difference that the tubes 2 are not inserted into the holes in the tube plate 6. Instead, the extremities of the tubes 2 are joined to the inner surface of tube plate 6 by welded joints 20. In this embodiment, the holes in the tube plate 6 are aligned with the lumen of the tubes 2.

Figure 6:
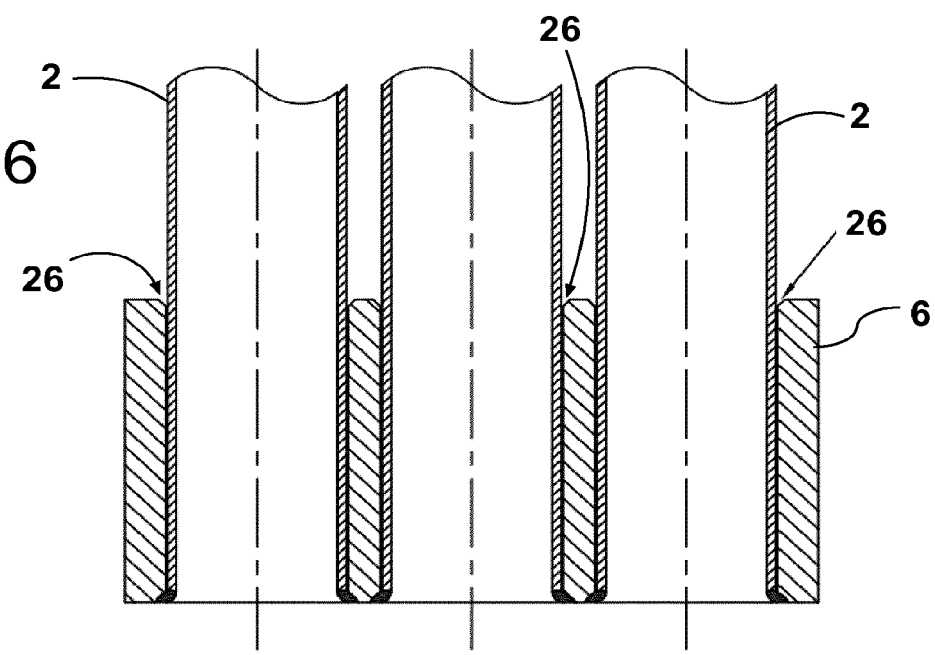
FIG. 6 is a sectional view showing details of a prior art hygienic heat exchanger shown in FIG. 1.

FIG. 6 illustrates how the tubes 2 are connected to the tube plates 6 in the prior art construction. The tubes 2 are inserted into the holes in the tube plates 6 and the extremities of the tubes 2 are connected to the tube plate 6 at the outer side of the tube plate 6 by welded joints 24. In the prior art there is a sharp corner 26 at the transition between the outer surface of the tubes 2 and the inwardly directed surface of the tube plate 6. Further, there are unavoidably crevices between the tubes and the holes of the tube plate 6 in which they are received. Both the sharp corner 26 and the crevices will be exposed to any liquid that is present in the interior of the heat exchanger 1, and consequently, the prior art design is not hygienic or sterile and cannot be used for food products in the interior of the shell 4. Bacteria are typically less than 0.0003 mm and can easily hide in a sharp corner 26 so hygienic cleaning of the prior art heat exchanger is not possible.

The heat exchanger according to the disclosure has several advantages. One of the advantages is that the heat exchanger according to the disclose is hygienic on inner side (shell side), no prior art heat exchanger has this feature. Another advantage is that the heat exchanger according to the disclosure is hygienic on both sides, inwards and inside lumen of tubes. No prior art heat exchanger is hygienic on both sides. Another advantage is that the heat exchanger according to the disclosure has a hygienic design on inwards side (shell side) that can be useful for sterile or aseptic food application. Another advantage of the heat exchanger according to the disclosure is that in prior heat exchangers art bacteria or viruses can hide in crevices or in corner 26, and with the heat exchanger according to the present disclosure no bacteria or viruses can hide from cleaning or disinfection. Bacteria are smaller than 0.0003 mm and viruses even smaller, thus it is unique the design in the heat exchanger according to the present disclosure that prevents very small bacteria and viruses from hiding. Another advantage of the heat exchanger according to the disclosure is a new and higher level for hygienic design is presented for inwards side of a compact tubular heat exchanger. Another advantage of the heat exchanger according to the disclosure that it is designed for use in aseptic food processing.

Different embodiments or implementations may yield one or more of the following advantages. It should be noted that this is not an exhaustive list and there may be other advantages which are not described herein.

Although the teaching of this application has been described in detail for purpose of illustration, it is understood that such detail is solely for that purpose, and variations can be made therein by those skilled in the art without departing from the scope of the teaching of this application. The term "comprising" as used in the claims does not exclude other elements or steps. The term "a" or "an" as used in the claims does not exclude a plurality.

The invention claimed is:

1. A method of fabricating a hygienic food product heat exchanger, the method comprising the steps of:
   assembling a tube bundle having a plurality of tubes with a first tube plate, the assembling step includes:
   inserting a respective first end of each tube of the tube bundle through a corresponding hole in the first tube plate, the first end passing from a first side of the first tube plate, through the first tube plate until flush with a second side of the first tube plate;

hygienically welding each first end of each tube at the second side of the first tube plate, wherein each weld smoothly translates between the second side of the first tube plate and an interior surface of each respective tube; and hygienically welding each tube at interface between an outer surface of each tube and an edge of the corresponding hole in the first side of the first tube plate, wherein each weld is created from inside the respective tube and smoothly translates between the first side of the first tube plate and the outer surface of each respective tube, wherein each weld extends along a complete circumference of each respective tube, wherein the fabricated hygienic food product heat exchanger is hygienic and free of cracks, crevices and fissures both inside and outside of the hygienic food product heat exchanger.

2. The method according to claim 1, further comprising the steps of:

assembling the tube bundle with a second tube plate, the assembling step includes:

inserting a respective second end of each tube of the tube bundle through a corresponding hole in the second tube plate, the second end passing from a first side of the second tube plate, through the second tube plate until flush with a second side of the second tube plate;

hygienically welding each second end of each tube at the second side of the second tube plate, wherein each weld smoothly translates between the second side of the second tube plate and an interior surface of each respective tube; and hygienically welding each tube at interface between an outer surface of each tube and an edge of the corresponding hole in the first side of the second tube plate, wherein each weld is created from inside the respective tube and smoothly translates between the first side of the second tube plate and the outer surface of each respective tube.

3. The method according to claim 2, further comprising the step of:

disposing the hygienic food product heat exchanger inside a housing, wherein the first tube plate and the second tube plate are each sealingly and hermetically secured inside the housing.

4. The method according to claim 3, further comprising the steps of:

creating a first inlet disposed in the housing and in fluid communication with a plurality of respective openings at one end of the tubes for allowing a first liquid food product medium to enter an interior of the tubes; and creating a first outlet disposed in the housing and in fluid communication with a plurality of respective openings at an opposite end of the tubes for allowing the first liquid food product medium to leave the interior of the tubes.

5. The method according to claim 4, further comprising the steps of:

creating a second inlet in fluid communication with an outside of the tubes between the two tube plates for allowing a second liquid food product to enter the interior of the housing; and creating a second outlet for allowing the second liquid food product to leave the interior of the housing; the second outlet being axially spaced from the second inlet so that the second liquid food product flows over the outside of the tubes between the second inlet and the second outlet; the second inlet being tangentially directed and the second outlet being tangentially directed for causing a helical flow path for the second liquid food medium when it flows from the second inlet to the second outlet.

6. The method according to claim 5, wherein the second inlet comprises a tangentially directed tubular conduit connected to the housing and wherein the second outlet comprises a tangentially directed tubular conduit connected to the housing.

7. The method according to claim 6, wherein the tangentially directed tubular conduit of the second inlet has an axis that is offset relative to a respective axis of the elongated cylindrical housing and the tangentially directed tubular conduit of the second outlet has an axis that is offset relative to the axis of the elongated cylindrical housing.

8. The method according to claim 5, further comprising the step of disposing a helical rod wound around and secured to the tube bundle for stimulating the second liquid food product to follow a helical flow path when it flows from the second inlet to the second outlet.

9. The method according to claim 1, wherein each of the tubes extends along a respective straight line between the tube plates and each of the tubes has a single diameter along a respective length of each of the tubes.

10. The method according to claim 1, wherein the distance (S) between the center lines of the tubes is less than twice an outer diameter of the tubes.

11. The method according to claim 1, wherein the tubes have an outer diameter between 10 mm and 50 mm, and all of the tubes have the same diameter.

12. The method according to claim 11, wherein the tube plate has a thickness that is larger than the outer diameter of the tubes.

13. A method of manufacturing a hygienic food product to food product axial tubular heat exchanger that comprises metal tube plates at each opposite end of an elongated heat exchanger housing and tightly spaced axial metal tubes extending between the tube plates, each of the tubes having a corresponding pair of ends, the method comprising:

securing and hermetically sealing the metal tube plates at the opposite ends of the elongated heat exchanger housing, wherein an inwardly facing side of each of the metal tube plates smoothly transitions to an inner surface of the elongated heat exchanger housing;

inserting the ends of the tubes through corresponding holes in the tube plates;

creating a first welded joint at an inner face of the tube plate, the first welded joint on the inner face of the tube plate being welded from an inside of each respective metal tube and extending in a complete circumference of each tube at an intersection of the inner face of the tube plate and the respective tube; and creating a second welding joint that is separate from the first welding joint at an outer face of the tube plate, each weld extending along the complete circumference of each respective tube by welding the tubes to the tube plates on the side of the tube plates that faces the interior of the elongated cylindrical housing for providing a smooth transition between the outer surface of a tube and the inwardly facing side of the tube plate.

14. The method according to claim 13, further comprising the steps of:

creating a first inlet disposed in the elongated heat exchanger housing and in fluid communication with a plurality of respective openings at one end of the tubes for allowing a first liquid food product medium to enter an interior of the tubes; and creating a first outlet disposed in the elongated heat exchanger housing and in fluid communication with a plurality of respective openings at an opposite end of the tubes for allowing the first liquid food product medium to leave the interior of the tubes.

15. The method according to claim 14, further comprising the steps of:

creating a second inlet in fluid communication with an outside of the tubes between the two tube plates for allowing a second liquid food product to enter the interior of the elongated cylindrical housing; and creating a second outlet for allowing the second liquid food product to leave the interior of the elongated housing; the second outlet being axially spaced from the second inlet so that the second liquid food product flows over the outside of the tubes between the second inlet and the second outlet; the second inlet being tangentially directed and the second outlet being tangentially directed for causing a helical flow path for the second liquid food medium when it flows from the second inlet to the second outlet.

16. The method according to claim 15, further comprising the step of disposing a helical rod wound around and secured to the tube bundle for stimulating the second liquid food product to follow a helical flow path when it flows from the second inlet to the second outlet.

17. The method according to claim 15, wherein the second inlet comprises a tangentially directed tubular conduit connected to the elongated and hollow cylindrical housing and wherein the second outlet comprises a tangentially directed tubular conduit connected to the elongated and hollow cylindrical housing.

18. The method according to claim 17, wherein the tangentially directed tubular conduit of the second inlet has an axis that is offset relative to a respective axis of the elongated cylindrical housing and the tangentially directed tubular conduit of the second outlet has an axis that is offset relative to the axis of the elongated cylindrical housing.

19. The method according to claim 13, wherein each of the tubes extends along a respective straight line between the tube plates and each of the tubes has a single diameter along a respective length of each of the tubes.

20. A method of fabricating a hygienic food product heat exchanger, method comprising the steps of:

assembling a tube bundle and pair of tube plates;

hygienically welding each tube of the tube bundle in a complete circumference at each interface between the respective tube and the pair of tube plates;

disposing the hygienically welded tube bundle and pair of tube plates within a housing; and securing and hermetically sealing the pair of tube plates at opposite ends of the housing, wherein an inwardly facing side of each of the tube plates smoothly transitions to an inner surface of the housing, wherein the fabricated hygienic food product heat exchanger is hygienic and free of cracks, crevices and fissures both inside and outside of the hygienic food product heat exchanger.

\* \* \* \* \*